United States Patent Office 3,117,822
Patented Jan. 14, 1964

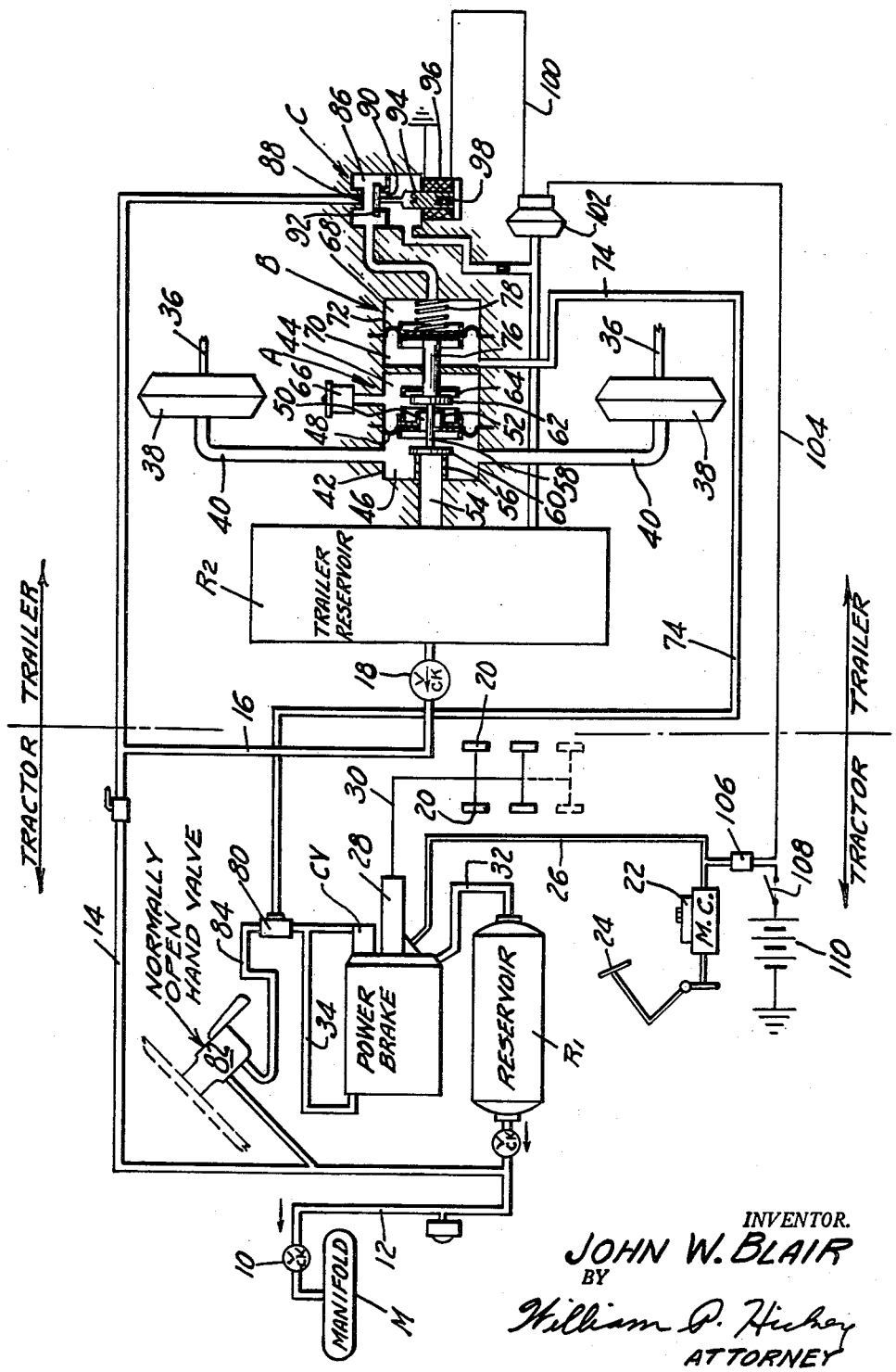

3,117,822
PNEUMATIC TRACTOR TRAILER BRAKING SYSTEM
John W. Blair, South Bend, Ind., assignor to The Bendix Corporation, South Bend, Ind., a corporation of Delaware
Filed Dec. 11, 1961, Ser. No. 158,244
3 Claims. (Cl. 303—7)

The present invention relates to pneumatically powered braking systems for tractor trailer vehicles in which the brakes of the trailing portion of the vehicle are normally released when a pressure differing from atmosphere is delivered to both a service and control line leading to the trailing portion of the vehicle, and in which the brakes of the trailing portion are actuated when atmospheric pressure is bled into the control line leading to the trailing portion of the vehicle; and more particularly to braking systems of this type which are actuated by means of vacuum.

One type of braking system with which we are concerned is shown in the E. R. Price Patent 2,871,064. In the type of braking system disclosed in that patent, the brakes of the trailer are actuated by means of a vacuum motor, into one opposing chamber of which a service vacuum line is normally communicated, and to the opposing chamber of which a control line is communicated. In the released condition of the trailer's brakes, vacuum of equal intensity is supplied to both the service and control lines; and when it is desired to operate the trailer's brakes, atmospheric pressure is bled into the control line.

One of the difficulties that is involved in the type of system to which the Price patent is directed, is that a decrease in vacuum in the service line decreases the force which the brake control motor can develop to actuate the trailer's brakes. The E. R Price patent provides a partial solution to this problem by supplying a valve mechanism which dumps full vacuum into the control motor chamber that is normally supplied with service vacuum, whenever the vacuum in the service line approaches within a predetermined limit of atmospheric pressure. Inasmuch as the vacuum in the service line is normally developed by the vehicle's propelling engine, this service vacuum must necessarily fluctuate widely; and in order that the brakes will not be automatically applied during these normal fluctuations, the vacuum level at which the vacuum sensing switch operates must be only a fraction of the full vacuum which can be supplied to the service line. Inasmuch as the pneumatic control motor is sized to require substantially complete vacuum in order to give a complete braking application, the system described in the E. R. Price patent will not provide a complete trailer brake application at vacuum levels slightly greater than that at which the emergency switch is set to operate. At vacuum levels just above that at which the emergency switch operates, the operator can apply the brakes by dumping full atmospheric pressure into the control line without the system developing a complete trailer brake application.

Accordingly, an object of the present invention is the provision of a new and improved system of the above described type wherein a complete trailer brake application can be had regardless of the amount of vacuum being supplied to the vacuum service line leading to the trailing portion of the vehicle.

A more particular object of the present invention is the provision of a new and improved system of the above mentioned type in which means are provided for sensing the level of pressure in a pneumatic reservoir mounted on the trailer and whose supply is used to actuate the trailer's brakes—said system further including means which will automatically communicate the pneumatic pressure of the reservoir to the normal service side of the control motor to provide a partial application of the trailer's brakes automatically.

A still further object of the present invention is the provision of a new and improved system of the above described type which will permit a complete trailer brake application at any time that the operator so desires, and will also communicate the reservoir to the normal service chamber of the control motor automatically when the pressure level of the reservoir reaches within a predetermined level of atmospheric pressure.

The invention resides in certain constructions, and combinations and arrangements of parts; and further objects and advantages of the invention will become apparent to those skilled in the art to which it releates with the following description of the preferred embodiment described with reference to the accompanying drawing forming a part of this specification, and in which:

The solitary FIGURE of the drawing is a schematic view of a vacuum powered tractor trailer braking system embodying principles of the present invention.

The tractor trailer braking system shown in the drawing is a vacuum powered one which obtains its vacuum from the manifold M of the tractor's propelling engine. Vacuum from the manifold M is communicated through a check valve 10 and vacuum supply line 12 to a vacuum reservoir $R_1$ that is mounted on the tractor portion of the vehicle. Vacuum from the supply line 12 is also communicated to a vacuum reservoir $R_2$ mounted on the trailer portion of the vehicle through the trailer vacuum supply line 14, branch supply line 16, and check valve 18.

The braking structures for each wheel of the tractor portion 20 of the vehicle are actuated by means of hydraulic pressure which is initially created in a conventional master cylinder 22. The master cylinder 22 is operated by means of a conventional foot pedal lever 24; and the master cylinder discharges pressure through the hydraulic line 26 to a hydraulic pressure intensifying unit or power brake 28, which in turn supplies the pressure through a hydraulic discharge line 30 to the tractor brakes 20. The hydraulic pressure intensifying unit 28 utilizes vacuum from the reservoir $R_1$ for creating a vacuum-to-atmospheric pressure differential as a power supply. The power section of the intensifying unit 28 is a vacuum submerged fluid pressure motor in which vacuum from the reservoir $R_1$ is continually supplied to one side of its power piston through line 32. The intensifying unit's control valve CV normally communicates vacuum from the supply line 32 through the control line 34 to the opposite side of the power piston so that vacuum normally exists on both sides of the unit's power piston. When hydraulic pressure is received from the master cylinder 22, the control valve CV bleeds atmospheric pressure through the control line 34 onto the back side of the unit's power piston to cause the motor to deliver a hydraulic pressure in line 30 which is at all times proportional, but larger than, the hydraulic pressure received from the master cylinder 22. A modulation in pressure to the tractor's brakes 20 is thereby produced to regulate the braking action for the wheels of the tractor.

The brakes of the trailer portion of the vehicle are mechanically operated by means of the pull rods 36, only two of which are shown in the drawing. The pull rods 36 are in turn actuated by means of atmospheric suspended vacuum motors or dish pans 38 which provide a pulling action on the rods 36 whenever vacuum is communicated to their vacuum supply lines 40. The supply of vacuum to the dish pans 38 is regulated by means of a control valve A having a housing 42 which includes an internal chamber therein that is divided into an atmospheric chamber 44 and a control chamber 46 by means of an internal diaphragm 48. The center portion of the diaphragm 48 is suitably stiffened and is provided with an atmospheric port which extends through the diaphragm and is surrounded by an atmospheric valve seat 52 which faces the atmospheric chamber 44. The valve housing 42 is provided with a vacuum port 54 which communicates with the reservoir $R_2$, and which is surrounded by a vacuum valve seat 56 which faces the control chamber 46. A spool shaped poppet member 58 is positioned through the atmospheric port 50 so that one of its flanges 60 is adapted to abut and close off the vacuum valve seat 56, and the other of its flanges 62 is adapted to abut and close off the atmospheric valve seat 52.

Control of the valve structure recited is had by means of a spider 64 which fits around the flange 62 and is fastened to the central portion of the diaphragm 48 to move the diaphragm toward and away from the flange 62. Atmospheric pressure is continually communicated to the atmospheric chamber 44 through a suitable air filter 66; and the diaphragm 48 is normally in the position shown in the drawing to communicate atmospheric pressure through the atmospheric port 50 to the dish pans 38. Actuating of the dish pans 38 is had by moving the spider 64 away from the vacuum port 54 to cause the atmospheric valve seat 52 to abut the flange 62 of the poppet member and thereby close off further atmospheric communication with the dish pans. Further movement of the spider 64 pulls the poppet member 58 out of engagement with the vacuum valve seat 56 to communicate vacuum with the dish pans 38, and so actuate the trailer's brakes. Vacuum in the control chamber 50 automatically produces a differential pressure across the diaphragm 48 which opposes actuating movement of the spider 64 so that the diaphragm 48 will cause the poppet member 58 to again abut the vacuum valve seat 56 when a degree of vacuum is produced in the control chamber 50 which is proportional to the amount of force being supplied to the spider 64.

Actuation of the control valve A is had by means of a control motor B which is positioned in the opposite end of the housing 42. The control motor B has an internal chamber that is divided into a service vacuum chamber 68, and a control chamber 70 by means of a power diaphragm 72. Control of the motor B is had by means of a pneumatic control line 74 that extends between the control chamber 70 and the tractor portion of the vehicle. In order that the brakes of the trailer will be automatically applied should the tractor and trailer become separated, and the control line 74 is ruptured, the control motor B is arranged so that vacuum of equal intensity is normally supplied to both the service chamber 68 and control chamber 70, and the unit is actuated by bleeding atmospheric pressure through the control line 74 into its control chamber 70. The power diaphragm 72 is connected to the spider 64 by means of an actuating rod 76; and a coil spring 78 is provided to bias the atmospheric valve seat 52 out of engagement with the flange 62 of the poppet whenever vacuum of equal intensity exists in the chambers 68 and 70. When atmospheric pressure is bled into the control line 74, the force of the spring 78 is overcome and the spider 64 is pulled into engagement with the poppet 58 to operate the valve structure in the manner previously described.

Inasmuch as the power section of the fluid pressure intensifying unit 28 is a normally vacuum suspended one, so that it too is actuated by bleeding atmospheric pressure into the unit, the control line 74 is tied into the control valve CV of the intensifying unit 28 through a shuttle valve 80. The brakes of the trailer are also adapted to be operated by means of a normally open hand valve 82 which communicates the vacuum supply line 12 with the shuttle valve 80 through the branch control line 84. The shuttle valve 80 has a piston which can shuttle between its opposite ends in such manner as to communicate either the control pressure from the hand control valve 82 or the control pressure from the power brake control valve CV, whichever is largest, to the trailer control line 74. For a more complete description of the shuttle valve 80 and hand control valve 82 reference may be had to the E. R. Price Patent 2,719,609.

In order that good modulation can be had of the control valve A, the diaphragm 72 of its control motor B is made of approximately the same size as the reaction diaphragm 48 of the control valve structure A. One of the difficulties of the system so far described, is that a small leak anywhere in the service or control lines leading to the trailer will cause the pressure in the service vacuum chamber 68 of the motor B to approach atmospheric pressure so that when atmospheric pressure is dumped into control line 74, only a partial trailer brake application can be made. This is by reason of the fact that the diaphragm 48 is approximately the same diameter as the diaphragm 72 so that the diaphragm 48 causes the poppet 58 to close off the vacuum valve seat 56 when a vacuum is delivered to the dish pans 38 which is approximately equal to that experienced in the service vacuum chamber 68.

According to principles of the present invention, applicant provides means for dumping full vacuum from the trailer reservoir $R_2$ into the service vacuum chamber 68 each time the operator desires to actuate the trailer's brakes. It should be pointed out that vacuum from the reservoir $R_2$ cannot be continually supplied to chamber 68 in deference to the amount of vacuum which exists in the control line 74, because this would produce a differential pressure across the diaphragm 72 which would drag the trailer's brakes. Should a partial leak occur anywhere in the service line 14 or the control line 74 leading to the trailer, it would be possible for the operator to operate the trailer brakes a sufficient number of times to bleed down the vacuum in the trailer reservoir $R_2$ to a point wherein insufficient vacuum would exist to stop the trailer, should an emergency occur. According to further principles of the present invention, means are provided for communicating the vacuum from the reservoir to the service chamber 68 of the control motor B automatically when the pressure in the trailer reservoir $R_2$ approaches a predetermined level with respect to atmospheric pressure. This level is set at a high enough vacuum to adequately stop the trailer portion of the vehicle, but is not set so high as to interfere with normal operation.

The means shown in the drawing for communicating vacuum from the reservoir $R_2$ to the chamber 68 comprises a two position valve structure C having a control chamber 86 which is continually communicated to the service chamber 68 of the control motor B. One end of the chamber 86 is provided with a vacuum port 88 to which the service line 14 always communicates, and the other end of the control chamber is provided with a reservoir vacuum port 90 that is aligned with the port 88. The ports 88 and 90 are adapted to be closed off by means of a poppet member 92 which is adapted to shuttle between the valve seats surrounding the respective ports; and in the embodiment shown in the drawing, this is accomplished by means of the armature 94 of an electrical solenoid 96.

According to further principles of the present invention, a spring member 98 is provided to bias the poppet member 92 into sealing engagement with the valve seat surrounding the service vacuum port 88; and the poppet member 92 is held into engagement with the reservoir valve seat surrounding the reservoir port 90 when the solenoid 96 is energized. The electrical supply line 100 for the solenoid 96 is connected to one terminal of a vacuum operated switch 102. The other terminal of the vacuum operated switch 102 is connected by a wire 104 with a normally closed hydraulically actuated switch 106 in the discharge of the master cylinder 22. The hydraulically actuated switch 106 is in turn normally energized through the ignition switch 108 and battery 110 mounted on the tractor portion of the vehicle. The vacuum operated switch 102 is a normally closed switch which is only closed when the pressure in the reservoir $R_2$ is below that level which will just produce a satisfactory emergency trailer brake application. By means of the electrical control circuit shown, the armature 94 will be operated to communicate vacuum from the reservoir $R_2$ to the control motor B each time the brake pedal lever 24 is actuated, and the armature will also be operated whenever the amount of vacuum in the reservoir $R_2$ becomes dangerously low. The system above described has the further advantage in that it will automatically put vacuum from the reservoir $R_2$ into the chamber 68 of the control motor B should the tractor and trailer become separated and the electrical interconnecting control wire 104 broken.

It will be apparent that the objects heretofore enumerated as well as others have been accomplished; and that there has been provided a vacuum actuated tractor trailer braking system which assures a complete trailer brake application each time that its control is operated by the driver of the vehicle, as well as during an emergency when the vacuum in the trailer's reservoir becomes dangerously low. It will further be apparent that the principles of the present invention can also be used in a system wherein its service and control lines are normally held above atmospheric pressure, and wherein atmospheric pressure is bled into the control line to operate the trailer's brakes.

While the invention has been described in considerable detail, I do not wish to be limited to the particular embodiments shown and described; and it is my intention to cover hereby all novel adaptations, modifications, and arrangements thereof which come within the practice of those skilled in the art to which the invention relates.

I claim:

1. In a braking system for a vehicle having separable towing and trailing portions, and whose towing portion has brakes operated by a brake actuating lever: a brake applying fluid pressure motor on said trailing portion actuated by a pressure differing from atmosphere; a normal but fluctuable source of said pressure differing from atmosphere; a reservoir on said trailing portion supplied by said fluctuable source of said pressure differing from atmosphere; check valve means interpositioned between said reservoir and said source for closing off communication therebetween when the intensity of said source falls below that existing in said reservoir; a control valve on said trailing portion and having a movable element which opens and closes communication between said reservoir and said fluid pressure motor; a fluid pressure actuated control motor on said trailing portion having a movable wall therein which operates said movable element and which movable wall separates opposing pressure chambers in said motor; a control line communicating with one of said opposing chambers; a normal supply line for communicating the other of said opposing chambers with said source; said control motor being arranged to cause said movable element to close communication between said reservoir and said first mentioned fluid pressure motor when pressures of substantially equal intensities exist in said opposing chambers, and to cause said movable element to open communication between said reservoir and said fluid pressure motor when atmospheric pressure is bled into said one opposing chamber and said differing pressure exists in said other opposing chamber; valve means isolating said reservoir from said other opposing chamber while communicating said normal supply line to said other opposing chamber when said valve means is in a normal position, and communicating said reservoir to said other opposing chamber while isolating said supply line from said other opposing chamber when said valve means is in another position, first control means moving said valve means from said normal position to said other position when the pressure in said reservoir approaches within a predetermined limit of atmospheric pressure, and second control means moving said valve means from said normal position to said other position when said brake actuating lever is actuated.

2. In a braking system for a vehicle having separable towing and trailing portions, and whose towing portion has brakes operated by a brake actuating lever: a brake applying fluid pressure motor on said trailing portion actuated by the application of a pressure differing from atmosphere; a normal but fluctuable source of said pressure differing from atmosphere; a reservoir on said trailing portion supplied by said fluctuable source of said pressure differing from atmosphere; check valve means interpositioned between said reservoir and said source for closing off communication therebetween when the intensity of said source falls below that existing in said reservoir; a control valve on said trailing portion and having a movable element which opens and closes communication between said reservoir and said fluid pressure motor; a fluid pressure actuated control motor on said trailing portion having a movable wall therein which operates said movable element and which movable wall separates opposing pressure chambers in said motor; a control line communicating with one of said opposing chambers; a normal supply line for communicating the other of said opposing chambers with said source; said control motor being arranged to cause said movable element to close communication between said reservoir and said first mentioned fluid pressure motor when pressures of substantially equal intensities exist in said opposing chambers, and to cause said movable element to open communication between said reservoir and said fluid pressure motor when atmospheric pressure is bled into said one opposing chamber and said differing pressure exists in said other opposing chamber; valve means having a solenoid operated two position control element, said valve means isolating said reservoir from said other opposing chamber while communicating said normal supply line to said other opposing chamber when said solenoid is energized, and communicating said reservoir to said other opposing chamber while isolating said supply line from said other opposing chamber when said solenoid is de-energized; a pressure switch in series electrical circuit with said solenoid energizing said solenoid when the pressure in said reservoir differs from that of the atmosphere by more than a predetermined amount; and a normally closed electrical supply switch in series circuit with said pressure switch and said solenoid, said electrical supply switch being opened when said brake actuating lever is actuated.

3. In a braking system for a vehicle having separable towing and trailing portions, and whose towing portion has hydraulically actuated brakes operated by a hydraulic master cylinder: a normally atmospheric suspended brake applying fluid pressure motor on said trailing portion actuated by the application of vacuum; a normal but fluctuable source of vacuum; a reservoir on said trailing portion supplied by said vacuum source; check valve means interpositioned between said reservoir and said source preventing pressure inflow to said reservoir from said source; a control valve on said trailing portion and having a movable element which opens and closes communication between said reservoir and said fluid pressure motor; a fluid pressure actuated control motor on said trailing portion having a movable wall therein which operates said movable element and which movable wall separates opposing pressure chambers in said motor; a normally vacuum suspended control line communicating with one of said opposing chambers; a normal vacuum supply line for communicating the other of said opposing chambers with said source; said control motor being arranged to cause said movable element to close communication between said reservoir and said first mentioned fluid pressure motor when vacuums of substantially equal intensities exist in said opposing chambers, and to cause said movable element to open communication between said reservoir and said fluid pressure motor when the pressure in said one opposing chamber is greater than in said other opposing chamber; valve means having a solenoid operated two position control element, said valve means isolating said reservoir from said other opposing chamber while communicating said normal supply line to said other opposing chamber when said solenoid is energized and communicating said reservoir to said other opposing chamber while isolating said supply line from said other opposing chamber when said solenoid is de-energized; a pressure switch in series electrical circuit with said solenoid energizing said solenoid when the pressure in said reservoir is below a predetermined value; a normally closed electrical supply switch in series circuit with said pressure switch and said solenoid; and a hydraulic pressure sensing device which opens said electrical supply switch when said master cylinder is operated.

References Cited in the file of this patent

UNITED STATES PATENTS

| | | |
|---|---|---|
| 2,871,064 | Price | Jan. 27, 1959 |
| 2,910,325 | Price et al. | Oct. 27, 1959 |

FOREIGN PATENTS

| | | |
|---|---|---|
| 856,990 | Great Britain | Dec. 21, 1960 |